(12) United States Patent
Gray et al.

(10) Patent No.: US 7,282,546 B2
(45) Date of Patent: Oct. 16, 2007

(54) COCATALYSTS FOR REDUCTION OF PRODUCTION PROBLEMS IN METALLOCENE-CATALYZED POLYMERIZATIONS

(75) Inventors: Steven Gray, Houston, TX (US); Henry Enriquez, Pearland, TX (US); David Knoeppel, League City, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 11/158,454

(22) Filed: Jun. 22, 2005

(65) Prior Publication Data

US 2006/0293472 A1 Dec. 28, 2006

(51) Int. Cl.
C08F 4/42 (2006.01)

(52) U.S. Cl. ........... 526/124.1; 526/352; 526/348.3; 526/348.4; 526/348.6; 526/160; 526/934; 526/124.5; 502/103; 502/132; 502/152

(58) Field of Classification Search ............ 526/352, 526/348.3, 348.4, 348.6, 160, 943, 124.5, 526/124.1; 502/103, 132, 152
See application file for complete search history.

(56) References Cited

U.S. PATENT DOCUMENTS

| | | | |
|---|---|---|---|
| 4,271,060 A | 6/1981 | Hubby | 260/33.6 A |
| 4,543,399 A | 9/1985 | Jenkins, III et al. | 526/70 |
| 4,588,790 A | 5/1986 | Jenkins, III et al. | 526/70 |
| 5,001,205 A | 3/1991 | Hoel | 526/128 |
| 5,026,798 A | 6/1991 | Canich | 526/127 |
| 5,028,670 A | 7/1991 | Chinh et al. | 526/73 |
| 5,236,998 A | 8/1993 | Lundeen et al. | 525/52 |
| 5,317,036 A | 5/1994 | Brady, III et al. | 523/223 |
| 5,352,749 A | 10/1994 | DeChellis et al. | 526/68 |
| 5,405,922 A | 4/1995 | DeChellis et al. | 526/68 |
| 5,436,304 A | 7/1995 | Griffin et al. | 526/68 |
| 5,456,471 A | 10/1995 | MacDonald | 273/195 A |
| 5,462,999 A | 10/1995 | Griffin et al. | 526/68 |
| 5,525,678 A | 6/1996 | Mink et al. | 525/246 |
| 5,589,555 A | 12/1996 | Zboril et al. | 526/64 |
| 5,616,661 A | 4/1997 | Eisinger et al. | 526/88 |
| 5,627,242 A | 5/1997 | Jacobsen et al. | 526/60 |
| 5,643,847 A | 7/1997 | Walzer, Jr. | 502/117 |
| 5,665,818 A | 9/1997 | Tilston et al. | 525/53 |
| 5,668,228 A | 9/1997 | Chinh et al. | 526/67 |
| 5,677,375 A | 10/1997 | Rifi et al. | 525/53 |
| 5,703,187 A | 12/1997 | Timmers | 526/282 |
| 5,747,406 A | 5/1998 | Reichle et al. | 502/117 |
| 5,830,820 A * | 11/1998 | Yano et al. | 502/62 |
| 5,849,852 A | 12/1998 | Koch et al. | 526/96 |
| 5,859,653 A | 1/1999 | Aoki et al. | 347/8 |
| 5,869,723 A | 2/1999 | Hinokuma et al. | 556/402 |
| 6,069,213 A | 5/2000 | Nemzek et al. | 526/113 |
| 6,147,173 A | 11/2000 | Holtcamp | 526/133 |
| 6,180,735 B1 | 1/2001 | Wenzel | 526/142 |
| 6,207,606 B1 | 3/2001 | Lue et al. | 502/113 |
| 6,211,105 B1 | 4/2001 | Holtcamp | 502/103 |
| 6,242,545 B1 | 6/2001 | Jejelowo et al. | 526/160 |
| 6,245,705 B1 | 6/2001 | Kissin | 502/117 |
| 6,245,868 B1 | 6/2001 | Agapiou et al. | 526/88 |
| 6,248,845 B1 | 6/2001 | Loveday et al. | 526/113 |
| 6,271,323 B1 | 8/2001 | Loveday et al. | 526/161 |
| 6,274,684 B1 | 8/2001 | Loveday et al. | 526/114 |
| 6,300,436 B1 | 10/2001 | Agapiou et al. | 526/154 |
| 6,340,730 B1 | 1/2002 | Murray et al. | 516/114 |
| 6,346,586 B1 | 2/2002 | Agapiou et al. | 526/160 |
| 6,359,072 B1 | 3/2002 | Whaley | 525/191 |
| 6,380,328 B1 | 4/2002 | McConville et al. | 526/119 |
| 6,420,580 B1 | 7/2002 | Holtcamp et al. | 526/11 |
| 6,777,366 B2 | 8/2004 | Gauthier et al. | 502/117 |
| 6,777,367 B2 | 8/2004 | Gauthier et al. | 502/117 |

FOREIGN PATENT DOCUMENTS

| | | | |
|---|---|---|---|
| EP | 0 426 638 A2 * | 5/1991 | |
| EP | 0 567 952 A1 * | 11/1993 | |
| EP | 0 590 486 A2 * | 4/1994 | |
| EP | 0 612 768 A1 * | 8/1994 | |
| EP | 0634424 | 1/1995 | |
| EP | 0 705 849 A1 * | 4/1996 | |

(Continued)

OTHER PUBLICATIONS

G. G. Hlatky; *Heterogeneous Single-Sitel Catalysts for Olefin Polymernzation*, Chemical Reviews, 2000, vol. 100, No. 4, pp. 1347-1376.

Primary Examiner—Ling-Sui Choi
(74) Attorney, Agent, or Firm—Shirley A. Kopecky

(57) ABSTRACT

Polyolefins may be prepared using a cocatalyst conforming to the formula:

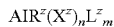

wherein $R^z$ is a linear or branched organic moiety having at least 5 carbons and $X^z$ is a linear or branched organic moiety having at least 5 carbons or a heterocyclic moiety having at least 4 atoms and can be anionic or di-anionic. The aluminum complex may also be in the form of an adduct complex where $L^z$ is a Lewis base and m=1-3. The cocatalyst $R^z$ components are selected such that they do not react with water under polymerization conditions to form a species that is highly soluble in the polymerization diluent. Use of the specified cocatalyst reduces fouling during metallocene-catalyzed runs and "post-metallocene hangover" when the same production equipment is transitioned to non-metallocene catalyst runs using catalysts such as chromium.

14 Claims, No Drawings

FOREIGN PATENT DOCUMENTS

| | | |
|---|---|---|
| EP | 0794200 | 9/1997 |
| EP | 0802202 | 10/1997 |
| WO | WO98/07515 | 2/1998 |
| WO | WO98/32775 | 7/1998 |
| WO | WO99/60033 | * 11/1999 |

* cited by examiner

COCATALYSTS FOR REDUCTION OF PRODUCTION PROBLEMS IN METALLOCENE-CATALYZED POLYMERIZATIONS

BACKGROUND OF THE INVENTION

1. Technical Field

This invention relates to polymers. More particularly, it relates to processes for the preparation of polymers using metallocene catalysts.

2. Background of the Art

Over the last several years it has been shown by a number of researchers that use of metallocene catalysts offers improvements in polymer properties when compared with production of similar polymers using Ziegler-Natta catalysts. For example, metallocene catalyzed polypropylene materials typically have lower xylene solubles than Ziegler-Natta catalyzed polymers. Such polyolefins typically have narrow molecular weight distributions. For example, films produced using metallocene catalyzed polyethylene resins may be used to produce films with increased clarity as compared to otherwise similar films produced with Ziegler-Natta resins. At least some of the improvements are attributable to the increased control of stereochemistry, molecular weight distribution, and comonomer incorporation obtainable with the metallocenes. This control enables tailoring of the final polymer and may offer improvements in areas as diverse as optical performance, strength performance, and the like.

Frequently cocatalysts are employed with metallocene catalysts. Frequent and effective choices for metallocene production runs are, for example, tri-isobutylaluminum ("TIBAl") and tri-ethylaluminum ("TEAl"). Such catalyst systems may be employed in conventional polymerization equipment such as, for example, loop reactors.

Unfortunately, TIBAl, for example, tends to decompose at elevated temperatures to form isobutylene. Isobutylene is a molecule that is very similar in molecular weight and boiling point to the isobutane diluent often employed in polymerization reaction mixtures. The result of this similarity is that a high steady-state isobutylene level may result during polymerization because the isobutylene is not readily separated from the isobutane diluent in the recycle purification system. In some cases, these materials can lower catalyst mileage. Additionally, the presence of alkenes not readily removed from the diluent can lead to production issues as this results diluent contaminated with alkene byproduct, in the case of TIBAl isobutylene, being sent to portions of the process where olefins can detrimentally affect the product process, for example, the catalyst feed and flush systems as well as various mechanical seal flushes.

SUMMARY OF THE INVENTION

In one aspect, the invention is a process for preparing a polyolefin, the process including using as components in a polymerization mixture a metallocene catalyst, a polymerization diluent, and a cocatalyst conforming to the formula

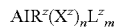   Formula I wherein $R^z$ is a linear or branched hydrocarbyl moiety having at least 5 carbons and $X^z$ is a linear or branched organic moiety having at least 5 carbons or heteroatom substituted organic moiety or a heterocyclic moiety having at least 4 atoms and can be anionic (n=2) or dianionic (n=1). $X^z$ can also be hydrogen. The aluminum complex may also be in the form of an adduct complex where $L^z$ is a Lewis base and m=1-3. The cocatalyst $R^z$ and $L^z$ components are selected such that if they react with water, they form a species with limited solubility in the polymerization diluent. The polymerization is carried out in the substantial absence of other cocatalysts, activators and scavengers that react with water under polymerization conditions to form species that are highly soluble in the polymerization diluent.

In another aspect, the invention is a polyolefin including the product of polymerizing an olefin monomer according to a process for preparing a polyolefin, the process including using as components in a polymerization mixture a metallocenee catalyst, a polymerization diluent, and a cocatalyst conforming to Formula I wherein $R^z$ is a linear or branched organic moiety having at least 5 carbons and $X^z$ is a linear or branched organic moiety having at least 5 carbons or a heterocyclic moiety having at least 4 atoms and can be anionic (n=2) or dianionic. The aluminum complex may also be in the form of an adduct complex where $L^z$ is a Lewis base and m=0-3. The cocatalyst $R^z$ and $L^z$ components are selected such that they do not react with water under polymerization conditions to form a species that displays high solubility in the polymerization diluent. The polymerization is carried out in the substantial absence of other cocatalysts, activators and scavengers that react with water under polymerization conditions to form species that are soluble in the diluent.

In still another aspect, the invention is an article of manufacture comprising a polyolefin film, fiber, blow molded, or injection molded article including the product of polymerizing an olefin monomer according to a process for preparing a polyolefin, the process including using as components in a polymerization mixture a metallocene catalyst, a polymerization diluent, and a cocatalyst conforming to Formula I wherein $R^z$ is a linear or branched organic moiety having at least 5 carbons and $X^z$ is a linear or branched organic moiety having at least 5 carbons or a heterocyclic moiety having at least 4 atoms and can be anionic (n=2) or dianionic. The aluminum complex may also be in the form of an adduct complex where $L^z$ is a Lewis base and m=0-3. The cocatalyst $R^z$ and $L^z$ components are selected such that they do not react with water under polymerization conditions to form a species that displays high solubility in the polymerization diluent. The polymerization is carried out in the substantial absence of other cocatalysts, activators and scavengers that react with water under polymerization conditions to form species that are soluble in the diluent.

Use of the invention enables polyolefin production with less fouling and with a reduced incidence of "post-metallocene hangovers" when the production equipment is transitioned to runs using non-metallocene catalysts such as chromium.

DETAILED DESCRIPTION OF THE INVENTION

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology. Various terms as used herein are shown below. To the extent a term used in a claim is not defined below, it should be given the broadest definition persons in the pertinent art have given that term as reflected in printed publications and issued patents.

In some embodiments, practice of the invention may result in a reduction in the amount of undesired olefin byproducts during the production of a polyolefin. The presence of such materials, for example isobutylene, may cause problems during the production of polyolefins. For example, it may decrease reactivity of certain metallocene catalysts during the course of a production run. Another problem that may be associated with the presence of isobutylene in polyolefin productions is a problem known colloquially as "post-metallocene hangover." This problem may be encountered when, for example, a loop reactor that has previously used a metallocene-catalyst system in combination with an aluminum alkyl, such as TIBAl, is then used for preparing olefins with chromium catalysts. Other catalyst systems, such as, for example, those based on chromium, may be sensitive to olefin byproducts of the cocatalyst, for example isobutylene produced by TIBAl, in these cases may show extremely poor activity. The reduction in activity may alter the melt flow values of the polymers being produced and/or the ultimate polymer properties leading to increases in the occurrence of undesirable off-grade product.

Other cocatalysts not within the scope of Formula I, such as TEAl for example, are as troublesome as TIBAl in polymerization. TEAl does not result in a build-up of isobutylene, but it does produce 1-butene. Like isobutylene, this $C_4$ alkene is also not readily removed from reactor recycle streams and can become an unwanted source of co-monomer and thus may also be undesirable in some applications. In some applications, isobutylene and butene and their effects may persist into succeeding, non-metallocene-catalyzed runs leading to production problems and higher off grade material. The invention offers an easy and effective means of avoiding production problems that have heretofore resulted from use of metallocene catalysts with cocatalysts that may include or degrade to or result in the production of undesirable olefin byproducts such as isobutylene, including, but not limited to TIBAl.

In addition, the use of a cocatalyst selected to conform to Formula I avoids a second problem that, it is hypothesized, may result initially from the almost unavoidable presence of small amounts of water in the polymerization mixture. This water, which may be present at a level of only a few parts per million, tends to react with TIBAl for example, to form highly soluble reaction products that may then operate to remove the metallocene from its support. The freed metallocene may then catalyze monomers under less controlled conditions, producing the undesirable results noted above, especially fouling. The resulting reaction products can persist, particularly in loop reactors, into succeeding runs. In some applications, fouling of reactor and/or powder processing equipment may result in excess strain on circulation pumps or, in extreme cases, heat transfer limitations from build-up of fouling material on the reactor walls.

For the purposes of the invention, the term "highly soluble" means that the partial water byproduct of the cocatalyst, presumably an aluminumoxane type species of the class, $[R^z_2Al]_2O$, is sufficiently soluble to serve as an effective reagent to remove the metallocene from the MAO-support commonly used in the art. For purpose of this invention, the term "undesired olefin" refers to any olefin that cannot be readily isolated from the diluent employed for the reaction or used in various other functions in the production process such as seal flushes or to slurry the catalyst. For example, in a process occurring in a diluent such as isobutane, the process will be negatively affected by isobutylene. Similarly, a hexane based process will be negatively affected by undesired production of hexene.

In contrast, cocatalysts conforming to Formula I do not readily decompose to provide undesired olefins inherently difficult to separate from the diluent recycle streams. In addition, these materials tend to react with water, if at all, to form poorly soluble species. Such species, particularly by virtue of their limited solubility, do not serve to extract the metallocene from the support and can minimize fouling by free metallocene during the run.

The cocatalysts may be in the form of Formula I that has the general formula:

$$AlR^z(X^z)_n L^z_m \quad \text{Formula I}$$

wherein $R^z$ is a linear or branched hydrocarbyl moiety having at least 5 carbons and $X^z$ is a linear or branched organic moiety having at least 5 carbons or a heterocyclic moiety having at least 4 atoms and can be anionic (n=2) or di-anionic (n=1), and $L^z$=0-3. As shown in Formula I, the aluminum complex may also be in the form of an adduct complex where L is an optional Lewis base and m=0-3. If the Lewis base is present, then in some embodiments, m=1-3. The catalyst components, $R^z$, $X^z$, and $L^z$ are selected such that they do not react with water under polymerization conditions to form a species that is soluble in the diluent. Additionally, $R^z$ is chosen such that it does not readily decompose or react to produce undesirable olefinic compounds, such as isobutylene or butene, in the production process. The polymerization is carried out in the substantial absence of other cocatalysts, activators and scavengers that react with water under polymerization conditions to form species that are soluble in the diluent. In embodiments where the Lewis base is absent, the cocatalyst will have a general formula:

$$AlR^z(X^z)_n L^z_m \quad \text{Formula Ia}$$

wherein $R^z$ is a linear or branched organic moiety having at least 5 carbons and $X^z$ is a linear or branched organic moiety having at least 5 carbons or a heterocyclic moiety having at least 4 atoms and can be anionic or di-anionic.

In Formula I, $R^z$ is a linear or branched hydrocarbyl moiety having at least 5 carbons while $X^z$ may be selected from a wide variety of organic moieties. Such moieties may include, for example, alkyls, cycloalkyls, halides, alkenyls, substituted alkyls, aryls, arylhalides, alkoxys, amides mixtures thereof, and the like. For example, in one embodiment, the cocatalyst may be Al(Octyl)(OBu)$_2$.

Heterocyclic moieties may also be selected. The ring of the heterocyclic compound may, for example, include at least one nitrogen, oxygen, and/or sulfur atom. In one embodiment, $X^z$ is a heterocyclic moiety and includes at least one nitrogen atom. Such heterocyclic compounds may include 4 or more ring members in one embodiment, and 5 or more ring members in another embodiment.

Where a heterocyclic compound is selected for use, it may be unsubstituted or substituted with one or a combination of substituent groups. Examples of suitable substituents include halogen, alkyl, alkenyl or alkynyl radicals, cycloalkyl radicals, aryl radicals, aryl substituted alkyl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, and any combination thereof. The substituents groups may also be substituted with halogens, particularly fluorine or bromine, or heteroatoms or the like.

For $X^z$, non-limiting examples of hydrocarbon substituents include methyl, ethyl, propyl, butyl, pentyl, hexyl, cyclopentyl, cyclohexyl, benzyl and phenyl groups and the like, including all their isomers, for example tertiary butyl, isopropyl, and the like. Other examples of substituents include fluoromethyl, fluoroethyl, difluoroethyl, iodopropyl, bromohexyl and chlorobenzyl.

In one embodiment, the heterocyclic compound may be unsubstituted. In another embodiment one or more positions on the heterocyclic compound are substituted with a halogen atom or a halogen atom containing group, for example a halogenated aryl group. In one embodiment the halogen is selected from the group consisting of chlorine, bromine and fluorine, and selected from the group consisting of fluorine and bromine in another embodiment, and the halogen is fluorine in yet another embodiment.

Non-limiting examples of heterocyclic compounds which may be utilized as the $X^z$ moiety include substituted and unsubstituted pyrroles, imidazoles, pyrazoles, pyrrolines, pyrrolidines, purines, carbazoles, and indoles, phenyl indoles, 2,5,-dimethylpyrroles, 3-pentafluorophenylpyrrole, 4,5,6,7-tetrafluoroindole and 3,4-difluoropyrroles.

If $X^z$ is a monoanionic ligand, then n=2. If $X^z$ is a dianionic ligand, then n=1. Where n=2, $R^z$ and $X^z$ may be the same or different. For example, in one embodiment, a particularly useful cocatalyst is tri-n-octylaluminum (TNOAI). In another embodiment, a particularly useful cocatalyst is tri-n-hexylaluminum. Combinations of cocatalysts of the invention may also be used. Mixtures of suitable catalysts may also be employed so long as the criteria above are met.

$L^z$, if present, is a Lewis base selected from ethers, aliphatic amines, aromatic amines and phosphines. Mixtures of Lewis bases may also be used. For example, in one embodiment, $L^z$ is diethyl ether. In another embodiment, $L^z$ is a mixture of diethyl ether and triethylamine. When present, the $L^z$ component may be present at a molar ratio of $L^z$ to cocatalyst of up to 3:1. As aluminum species are known to exchange ligands of this class according to the process:

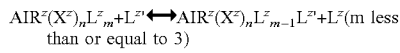
(m less than or equal to 3)

excess ligand, L, may also be present to retard ligand dissociation and the formation of lower coordination; conversely, a slight amount such as 0.1 equivalents may be added to favor the formation of a slightly high coordination about the aluminum center:

(m less than 3).

It is important to note that at least some of the foregoing moieties and compounds arising therefrom, listed hereinabove relative to the cocatalyst selection, may also or alternatively be selected to serve as activators and/or scavengers. Regardless of official denomination in a given polymerization mixture, however, it is important to note that none of these polymerization mixture components should be selected such that they do not undesirably interfere with the production improvements that may be attained through use of the invention. Such interference would occur if they serve to produce, under polymerization conditions, soluble species that are difficult to separate from the polymerization diluent using, for example, distillation, and which are therefore undesirable.

If activators per se are included, in addition to at least one material defined or implicitly or explicitly described hereinabove as a potential cocatalyst adhering to Formula I, such may alternatively be selected from those described in WO 98/07515, which is incorporated by reference herein. Such possible activator selections include, for example, tris (2,2', 2"-nonafluorobiphenyl)fluoroaluminate. Other activators include aluminum/boron complexes, perchlorates, periodates and iodates including their hydrates; lithium (2,2'-bisphenyl-ditrimethylsilicate)-4T-HF; and silylium salts in combination with a non-coordinating compatible anion. Also, methods of activation, such as using radiation, electrochemical oxidation, and the like, are also contemplated as activating methods for the purpose of rendering the neutral metallocene-type catalyst compound, or precursor to a metallocene-type cation, capable of polymerizing olefins. Other activators or methods for activating a metallocene-type catalyst compound are described in, for example, U.S. Pat. Nos. 5,849,852, 5,859,653 and 5,869,723; and WO 98/32775, which references are incorporated herein by reference.

In general the cocatalysts of the invention are desirably present within the range of from about 5 ppm to about 1000 ppm in the solvent used to prepare the catalyst used in the polymerization, which is often isobutane. Where an activator is also selected, it may be desirably combined in mole ratios of activator to catalyst of from about 1000:1 to about 0.1:1 in one embodiment, and from 300:1 to 1:1 in another embodiment, and from 150:1 to 1:1 in a still another embodiment, wherein a desirable range may include any combination of any upper mole ratio limit with any lower mole ratio limit described herein.

The activators may or may not be associated with or bound to a support, either in association with the catalyst component (e.g., metallocene) or separate from the catalyst component, such as described by Gregory G. Hlatky, *Heterogeneous Single-Site Catalysts for Olefin Polymerization* 100(4) CHEMICAL REVIEWS 1347-1374 (2000). The cocatalyst, may function to activate the metallocene, scavenge water and even act as a chain transfer agent, is some applications.

The metallocene used in conjunction with the cocatalyst conforming to Formula I may be selected from any known metallocene catalysts useful for olefin preparation. Metallocene catalysts may be characterized generally as coordination compounds incorporating one or more cyclopentadienyl (Cp) groups (which may be substituted or unsubstituted, each substitution being the same or different) coordinated with a transition metal through n bonding. The Cp substituent groups may be linear, branched or cyclic hydrocarbyl radicals. The cyclic hydrocarbyl radicals may further form other contiguous ring structures, including, for example indenyl, azulenyl and fluorenyl groups. These additional ring structures may also be substituted or unsubstituted by hydrocarbyl radicals, such as $C_1$ to $C_{20}$ hydrocarbyl radicals.

A specific example of a metallocene catalyst is a bulky ligand metallocene compound generally represented by the formula:

$$[L]_m M[A]_n \qquad \text{Formula II}$$

where L is a bulky ligand, A is a leaving group, M is a transition metal and m and n are such that the total ligand valency corresponds to the transition metal valency. For example m may be from 1 to 3 and n may be from 1 to 3.

The metal atom "M" of the metallocene catalyst compound may be selected from Groups 3 through 12 atoms and lanthanide Group atoms in one embodiment; and selected from Groups 3 through 10 atoms in a more particular embodiment, and selected from Sc, Ti, Zr, Hf, V, Nb, Ta, Mn, Re, Fe, Ru, Os, Co, Rh, Ir, and Ni in yet a more particular embodiment; and selected from Groups 4, 5 and 6 atoms in yet a more particular embodiment, and Ti, Zr, Hf atoms in yet a more particular embodiment, and Zr in yet a more particular embodiment. The oxidation state of the metal atom "M" may range from 0 to +7 in one embodiment; and in a more particular embodiment, is +1, +2, +3, +4 or +5; and in yet a more particular embodiment is +2, +3 or +4. The groups bound the metal atom "M" are such that the compounds described below in the formulas and structures are electrically neutral, unless otherwise indicated.

The bulky ligand generally includes a cyclopentadienyl group (Cp) or a derivative thereof. The Cp ligand(s) form at least one chemical bond with the metal atom M to form the "metallocene catalyst compound". The Cp ligands are distinct from the leaving groups bound to the catalyst compound in that they are not highly susceptible to substitution/abstraction reactions.

The Cp group typically includes fused ring(s) and/or substituted ring or fused ring systems. The ring(s) or ring system(s) typically include atoms selected from group 13 to 16 atoms, for example, carbon, nitrogen, oxygen, silicon, sulfur, phosphorous, germanium, boron, aluminum and combinations thereof, wherein carbon makes up at least 50% of the ring members. Non-limiting examples include cyclopentadienyl, cyclopentaphenanthreneyl, indenyl, benzindenyl, fluorenyl, tetrahydroindenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated versions thereof (e.g., 4,5,6,7-tetrahydroindenyl, or "$H_4Ind$"), substituted versions thereof, and heterocyclic versions thereof.

Cp substituent groups may include hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. More particular non-limiting examples of alkyl substituents include methyl, ethyl, propyl, butyl, pentyl, hexyl, cyclopentyl, cyclohexyl, benzyl, phenyl, methylphenyl, and tert-butylphenyl groups and the like, including all their isomers, for example tertiary-butyl, isopropyl, and the like. Other possible radicals include substituted alkyls and aryls, optionally containing halogens such as, for example, fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris (trifluoromethyl)silyl, methylbis(difluoromethyl)silyl, bromomethyldimethylgermyl and the like; and disubstituted boron radicals including dimethylboron for example; and disubstituted Group 15 radicals including dimethylamine, dimethylphosphine, diphenylamine, methylphenylphosphine, Group 16 radicals including methoxy, ethoxy, propoxy, phenoxy, methylsulfide and ethylsulfide. Other substituents R include olefins such as but not limited to olefinically unsaturated substituents including vinyl-terminated ligands, for example 3-butenyl, 2-propenyl, 5-hexenyl and the like. In one embodiment, at least two alkyl groups, two adjacent alkyl groups in one embodiment, are joined to form a ring structure having from 3 to 30 atoms selected from the group consisting of carbon, nitrogen, oxygen, phosphorous, silicon, germanium, aluminum, boron and combinations thereof. Also, a substituent alkyl group such as 1-butanyl may form a bonding association to the element M.

Each anionic leaving group is independently selected and may include any leaving group, such as halogen ions, hydrides, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof; hydride, halogen ions, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, and $C_7$ to $C_{18}$ fluoroalkylaryls in yet a more particular embodiment; hydride, chloride, fluoride, methyl, phenyl, phenoxy, benzoxy, tosyl, fluoromethyls and fluorophenyls in yet a more particular embodiment; $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls and $C_1$ to $C_{12}$ heteroatom-containing alkyls, $C_1$ to $C_{12}$ heteroatom-containing aryls and $C_1$ to $C_{12}$ heteroatom-containing alkylaryls in yet a more particular embodiment; chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls in yet a more particular embodiment; fluoride, methyl, ethyl, propyl, phenyl, methylphenyl, dimethylphenyl, trimethylphenyl, fluoromethyls (mono-, di- and trifluoromethyls) and fluorophenyls (mono-, di-, tri-, tetra- and pentafluorophenyls) in yet a more particular embodiment; and fluoride in yet a more particular embodiment.

Other non-limiting examples of leaving groups include amines, phosphines, ethers, carboxylates, dienes, hydrocarbon radicals having from 1 to 20 carbon atoms, fluorinated hydrocarbon radicals (e.g., $-C_6F_5$ (pentafluorophenyl)), fluorinated alkylcarboxylates (e.g., $CF_3C(O)O^-$), hydrides and halogen ions and combinations thereof. Other examples of leaving groups include alkyl groups such as cyclobutyl, cyclohexyl, methyl, heptyl, tolyl, trifluoromethyl, tetramethylene, pentamethylene, methylidene, methyoxy, ethyoxy, propoxy, phenoxy, bis(N-methylanilide), dimethylamide, dimethylphosphide radicals and the like. In one embodiment, two or more leaving groups form a part of a fused ring or ring system.

L and A may be bridged to one another. In catalysts where there are two L groups, they may be bridged to each other. A bridged metallocene, for example may, be described by the general formula:

$$XCp^A Cp^B MA_n \qquad \text{FORMULA III}$$

wherein X is a structural bridge, $Cp^A$ and $Cp^B$ each denote a cyclopentadienyl group, each being the same or different and which may be either substituted or unsubstituted, M is a transition metal and A is an alkyl, hydrocarbyl or halogen group and n is an integer between 0 and 4, and either 1 or 2 in a particular embodiment.

Non-limiting examples of bridging groups (X) include divalent hydrocarbon groups containing at least one Group 13 to 16 atom, such as but not limited to at least one of a carbon, oxygen, nitrogen, silicon, aluminum, boron, germanium and tin atom and combinations thereof; wherein the heteroatom may also be $C_1$ to $C_{12}$ alkyl or aryl substituted to satisfy neutral valency. The bridging group may also contain substituent groups as defined above including halogen radicals and iron. More particular non-limiting examples of bridging group are represented by $C_1$ to $C_6$ alkylenes, substituted $C_1$ to $C_6$ alkylenes, oxygen, sulfur, $R_2C=$, $R_2Si=$, $—Si(R)_2Si(R_2)—$, $R_2Ge=$, $RP=$ (wherein "=" represents two chemical bonds), where R is independently selected from the group hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and wherein two or more Rs may be joined to form a ring or ring system. In one embodiment, the bridged metallocene catalyst component has two or more bridging groups (X).

Other non-limiting examples of bridging groups include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties, wherein the Si atom is replaced by a Ge or a C atom; dimethylsilyl, diethylsilyl, dimethylgermyl and/or diethylgermyl. The bridging groups may also have carbons or silicons having an olefinic substituent.

In another exemplary catalyst, the bridging group may also be cyclic, and include 4 to 10 ring members or 5 to 7 ring members in a more particular embodiment. The ring members may be selected from the elements mentioned above, and/or from one or more of B, C, Si, Ge, N and O in a particular embodiment. Non-limiting examples of ring structures which may be present as or part of the bridging moiety are cyclobutylidene, cyclopentylidene, cyclohexylidene, cycloheptylidene, cyclooctylidene and the corresponding rings where one or two carbon atoms are replaced by at least one of Si, Ge, N and O, in particular, Si and Ge. The bonding arrangement between the ring and the Cp groups may be cis-, trans-, or a combination thereof.

The cyclic bridging groups may be saturated or unsaturated and/or carry one or more substituents and/or be fused to one or more other ring structures. If present, the one or more substituents are selected from the group hydrocarbyl (e.g., alkyl such as methyl) and halogen (e.g., F, Cl) in one embodiment. The one or more Cp groups which the above cyclic bridging moieties may optionally be fused to may be saturated or unsaturated and are selected from the group of those having 4 to 10 ring members, more particularly 5, 6 or 7 ring members (selected from the group of C, N, O and S in a particular embodiment) such as, for example, cyclopentyl, cyclohexyl and phenyl. Moreover, these ring structures may themselves be fused such as, for example, in the case of a naphthyl group. Moreover, these (optionally fused) ring structures may carry one or more substituents. Illustrative, non-limiting examples of these substituents are hydrocarbyl (particularly alkyl) groups and halogen atoms.

The metallocene catalysts also includes the CpFlu family of catalysts (e.g., a metallocene incorporating a substituted Cp fluorenyl ligand structure) represented by the following formula:

$X(CpR^1{}_nR^2{}_m)(Flu^3{}_p)$     Formula IV wherein Cp is a cyclopentadienyl group, Fl is a fluorenyl group, X is a structural bridge between Cp and Flu, $R^1$ is a substituent on the Cp, n is 1 or 2, $R^2$ is a substituent on the Cp at a position which is proximal to the bridge, m is 1 or 2, each $R^3$ is the same or different and is a hydrogen or a hydrocarbyl group having from 1 to 20 carbon atoms with $R^3$ being substituted on a nonproximal position on the fluorenyl group and at least one other $R^3$ being substituted at an opposed nonproximal position on the fluorenyl group and p is 2 or 4.

Another family of the metallocene catalyst includes bridged mono-ligand metallocene compounds (e.g., mono cyclopentadienyl catalyst components). In this embodiment, at least one metallocene catalyst component is a bridged "half-sandwich" metallocene catalyst. In yet another aspect of the invention, the at least one metallocene catalyst component is an unbridged "half sandwich" metallocene. The "half sandwich" metallocenes above are alternatively and further described in U.S. Pat. Nos. 6,069,213, 5,026,798, 5,703,187, and U.S. Pat. No. 5,747,406, including a dimer or oligomeric structure, such as disclosed in, for example, U.S. Pat. Nos. 5,026,798 and 6,069,213, which are incorporated by reference herein.

Non-limiting examples of metallocene catalyst components include:
cyclopentadienylzirconium$A_n$,
indenylzirconium$A_n$,
(1-methylindenyl)zirconium$A_n$,
(2-methylindenyl)zirconium$A_n$,
(1-propylindenyl)zirconium$A_n$,
(2-propylindenyl)zirconium$A_n$,
(1-butylindenyl)zirconium$A_n$,
(2-butylindenyl)zirconium$A_n$,
methylcyclopentadienylzirconium$A_n$,
tetrahydroindenylzirconium$A_n$,
pentamethylcyclopentadienylzirconium$A_n$,
cyclopentadienylzirconium$A_n$,
pentamethylcyclopentadienyltitanium$A_n$,
tetramethylcyclopentyltitanium$A_n$,
(1,2,4-trimethylcyclopentadienyl)zirconium$A_n$,
dimethylsilyl(1,2,3,4-tetramethylcyclopentadienyl)(cyclopentadienyl)zirconium$A_n$,
dimethylsilyl(1,2,3,4-tetramethylcyclopentadienyl)(1,2,3-trimethylcyclopentadienyl)zirconium$A_n$,
dimethylsilyl(1,2,3,4-tetramethylcyclopentadienyl)(1,2-dimethylcyclopentadienyl)zirconium$A_n$,
dimethylsilyl(1,2,3,4-tetramethylcyclopentadienyl)(2-methylcyclopentadienyl)zirconium$A_n$,
dimethylsilylcyclopentadienylindenylzirconium$A_n$,
dimethylsilyl(2-methylindenyl)(fluorenyl)zirconium$A_n$,
diphenylsilyl(1,2,3,4-tetramethylcyclopentadienyl)(3-propylcyclopentadienyl)zirconium$A_n$,
dimethylsilyl(1,2,3,4-tetramethylcyclopentadienyl)(3-t-butylcyclopentadienyl)zirconium$A_n$,
dimethylgermyl(1,2-dimethylcyclopentadienyl)(3-isopropylcyclopentadienyl)zirconium$A_n$,
dimethylsilyl(1,2,3,4-tetramethylcyclopentadienyl)(3-methylcyclopentadienyl)zirconium$A_n$,
diphenylmethylidene(cyclopentadienyl)(9-fluorenyl)zirconium$A_n$, diphenylmethylidenecyclopentadienylindenylzirconium$A_n$,
isopropylidenebiscyclopentadienylzirconium$A_n$,
isopropylidene(cyclopentadienyl)(9-fluorenyl)zirconium$A_n$,
isopropylidene(3-methylcyclopentadienyl)(9-fluorenyl)zirconium$A_n$,
ethylenebis(9-fluorenyl)zirconium$A_n$,
mesoethylenebis(1-indenyl)zirconium$A_n$,
ethylenebis(1-indenyl)zirconium$A_n$,
ethylenebis(2-methyl-1-indenyl)zirconium$A_n$,
ethylenebis(2-methyl-4,5,6,7-tetrahydro-1-indenyl)zirconium$A_n$,
ethylenebis(2-propyl4,5,6,7-tetrahydro-1-indenyl)zirconium$A_n$,
ethylenebis(2-isopropyl-4,5,6,7-tetrahydro-1-indenyl)zirconium$A_n$,
ethylenebis(2-butyl-4,5,6,7-tetrahydro-1-indenyl)zirconium$A_n$,
ethylenebis(2-isobutyl-4,5,6,7-tetrahydro-1-indenyl)zirconium$A_n$,
dimethylsilyl(4,5,6,7-tetrahydro-1-indenyl)zirconium$A_n$,
diphenyl(4,5,6,7-tetrahydro-1-indenyl)zirconium$A_n$,
ethylenebis(4,5,6,7-tetrahydro-1-indenyl)zirconium$A_n$,
dimethylsilylbis(cyclopentadienyl)zirconium$A_n$,
dimethylsilylbis(9-fluorenyl)zirconium$A_n$,
dimethylsilylbis(1-indenyl)zirconium$A_n$,
dimethylsilylbis(2-methylindenyl)zirconium$A_n$,
dimethylsilylbis(2-propylindenyl)zirconium$A_n$,
dimethylsilylbis(2-butylindenyl)zirconium$A_n$,
diphenylsilylbis(2-methylindenyl)zirconium$A_n$,
diphenylsilylbis(2-propylindenyl)zirconium$A_n$,
diphenylsilylbis(2-butylindenyl)zirconium$A_n$,
dimethylgermylbis(2-methylindenyl)zirconium$A_n$,
dimethylsilylbistetrahydroindenylzirconium$A_n$,
dimethylsilylbistetramethylcyclopentadienylzirconium$A_n$,
dimethylsilyl(cyclopentadienyl)(9-fluorenyl)zirconium$A_n$,
diphenylsilyl(cyclopentadienyl)(9-fluorenyl)zirconium$A_n$,
diphenylsilylbisindenyizirconium$A_n$,
cyclotrimethylenesilyltetramethylcyclopentadienylcyclopentadienylzirconium$A_n$,
cyclotetramethylenesilyltetramethylcyclopentadienylcyclopentadienylzirconium$A_n$,
cyclotrimethylenesilyl(tetramethylcyclopentadienyl)(2-methylindenyl)zirconium$A_n$,
cyclotrimethylenesilyl(tetramethylcyclopentadienyl)(3-methylindenyl)zirconium$A_n$,
cyclotrimethylenesilylbis(2-methylindenyl)zirconium$A_n$,
cyclotrimethylenesilyl(tetramethylcyclopentadienyl)(2,3,5-trimethylclopentadienyl)zirconium$A_n$,
cyclotrimethylenesilylbis(tetramethylcyclopentadienyl)zirconium$A_n$,
dimethylsilyl(tetramethylcyclopentadieneyl)(N-tertbutylamido)titanium$A_n$,
biscyclopentadienylchromium$A_n$,
biscyclopentadienylzirconium$A_n$,
bis(n-butylcyclopentadienyl)zirconium$A_n$,
bis(n-dodecylcyclopentadienyl)zirconium$A_n$,
bisethylcyclopentadienylzirconium$A_n$,
bisisobutylcyclopentadienylzirconium$A_n$,
bisisopropylcyclopentadienylzirconium$A_n$,
bismethylcyclopentadienylzirconium$A_n$,
bisnoxtylcyclopentadienylzirconium$A_n$,
bis(n-pentylcyclopentadienyl)zirconium$A_n$,
bis(n-propylcyclopentadienyl)zirconium$A_n$,
bistrimethylsilylcyclopentadienylzirconium$A_n$,
bis(1,3-bis(trimethylsilyl)cyclopentadienyl)zirconium$A_n$,
bis(1-ethyl-2-methylcyclopentadienyl)zirconium$A_n$,
bis(1-ethyl-3-methylcyclopentadienyl)zirconium$A_n$,
bispentamethylcyclopentadienylzirconium$A_n$,
bispentamethylcyclopentadienylzirconium$A_n$,
bis(1-propyl-3-methylcyclopentadienyl)zirconium$A_n$,
bis(1-n-butyl-3-methylcyclopentadienyl)zirconium$A_n$,
bis(1-isobutyl-3-methylcyclopentadienyl)zirconium$A_n$,
bis(1-propyl-3-butylcyclopentadienyl)zirconium$A_n$,
bis(1,3-n-butylcyclopentadienyl)zirconium$A_n$,
bis(4,7-dimethylindenyl)zirconium$A_n$,
bisindenylzirconium$A_n$,
bis(2-methylindenyl)zirconium$A_n$,
cyclopentadienylindenylzirconium$A_n$,
bis(n-propylcyclopentadienyl)hafnium$A_n$,
bis(n-butylcyclopentadienyl)hafnium$A_n$,
bis(n-pentylcyclopentadienyl)hafnium$A_n$,
(n-propylcyclopentadienyl)(n-butylcyclopentadienyl)hafnium$A_n$,
bis[(2-trimethylsilylethyl)cyclopentadienyl]hafnium$A_n$,
bis(trimethylsilylcyclopentadienyl)hafnium$A_n$,
bis(2-n-propylindenyl)hafnium$A_n$,
bis(2-n-butylindenyl)hafnium$A_n$,
dimethylsilylbis(n-propylcyclopentadienyl)hafnium$A_n$,
dimethylsilylbis(n-butylcyclopentadienyl)hafnium$A_n$,
bis(9-n-propylfluorenyl)hafnium$A_n$,
bis(9-n-butylfluorenyl)hafnium$A_n$,
(9-n-propylfluorenyl)(2-n-propylindenyl)hafnium$A_n$,
bis(1-n-propyl-2-methylcyclopentadienyl)hafnium$A_n$,
(n-propylcyclopentadienyl)(1-n-propyl-3-n-butylcyclopentadienyl)hafnium$A_n$,
dimethylsilyltetramethylcyclopentadienylcyclopropylamidotitanium$A_n$,
dimethylsilyltetramethylcyclopentadienylcyclobutylamidotitanium$A_n$,
dimethylsilyltetramethylcyclopentadienylcyclopentylamidotitanium$A_n$,
dimethylsilyltetramethylcyclopentadienylcyclohexylamidotitanium$A_n$,
dimethylsilyltetramethylcyclopentadienylcycloheptylamidotitanium$A_n$,
dimethylsilyltetramethylcyclopentadienylcyclooctylamidotitanium$A_n$,
dimethylsilyltetramethylcyclopentadienylcyclononylamidotitanium$A_n$,
dimethylsilyltetramethylcyclopentadienylcyclodecylamidotitanium$A_n$,
dimethylsilyltetramethylcyclopentadienylcycloundecylamidotitanium$A_n$,
dimethylsilyltetramethylcyclopentadienylcyclododecylamidotitanium$A_n$,
dimethylsilyltetramethylcyclopentadienyl(sec-butylamido)titanium$A_n$,
dimethylsilyl(tetramethylcyclopentadienyl)(n-octylamido)titanium$A_n$,
dimethylsilyl(tetramethylcyclopentadienyl)(n-decylamido)titanium$A_n$,
dimethylsilyl(tetramethylcyclopentadienyl)(n-octadecylamido)titanium$A_n$,
methylphenylsilyltetramethylcyclopentadienylcyclopropylamidotitanium$A_n$,
methylphenylsilyltetramethylcyclopentadienylcyclobutylamidotitanium$A_n$,
methylphenylsilyltetramethylcyclopentadienylcyclopentylamidotitanium$A_n$,
methylphenylsilyltetramethylcyclopentadienylcyclohexylamidotitanium$A_n$,
methylphenylsilyltetramethylcyclopentadienylcycloheptylamidotitanium$A_n$, methylphenylsilyltetramethyl-
cyclopentadienylcyclooctylamidotitanium$A_n$,
methylphenylsilyltetramethyl-
cyclopentadienylcyclononylamidotitanium$A_n$,
methylphenylsilyltetramethyl-
cyclopentadienylcyclodecylamidotitanium$A_n$,
methylphenylsilyltetramethyl-
cyclopentadienylcycloundecylamidotitanium$A_n$,
methylphenylsilyltetramethyl-
cyclopentadienylcyclododecylamidotitanium$A_n$,
methylphenylsilyl(tetramethylcyclopentadienyl)(sec-butylamido)titanium$A_n$,
methylphenylsilyl(tetramethylcyclopentadienyl)(n-octylamido)titanium$A_n$,
methylphenylsilyl(tetramethylcyclopentadienyl)(n-decylamido)titanium$A_n$,
methylphenylsilyl(tetramethylcyclopentadienyl)(n-octadecylamido)titanium$A_n$,
diphenylsilyltetramethylcyc-
lopentadienylcyclopropylamidotitanium$A_n$,
diphenylsilyltetramethylcyc-
lopentadienylcyclobutylamidotitanium$A_n$,
diphenylsilyltetramethylcyc-
lopentadienylcyclopentylamidotitanium$A_n$.
diphenylsilyltetramethylcyc-
lopentadienylcyclohexylamidotitanium$A_n$,
diphenylsilyltetramethylcyc-
lopentadienylcycloheptylamidotitanium$A_n$,
diphenylsilyltetramethylcyc-
lopentadienylcyclooctylamidotitanium$A_n$,
diphenylsilyltetramethylcyc-
lopentadienylcyclononylamidotitanium$A_n$,
diphenylsilyltetramethylcyc-
lopentadienylcyclodecylamidotitanium$A_n$,
diphenylsilyltetramethylcyc-
lopentadienylcycloundecylamidotitanium$A_n$,
diphenylsilyltetramethylcyc-
lopentadienylcyclododecylamidotitanium$A_n$,
diphenylsilyl(tetramethylcyclopentadienyl)(sec-butylamido)titanium$A_n$,
diphenylsilyl(tetramethylcyclopentadienyl)(n-octylamido)titanium$A_n$,
diphenylsilyl(tetramethylcyclopentadienyl)(n-decylamido)titanium$A_n$,
diphenylsilyl(tetramethylcyclopentadienyl)(n-octadecylamido)titanium$A_n$, and derivatives thereof.

Metallocene catalysts may be supported or unsupported. Typical support materials may include talc, inorganic oxides, clays and clay minerals, ion-exchanged layered compounds, diatomaceous earth compounds, zeolites or a resinous support material, such as a polyolefin. Specific inorganic oxides include silica, alumina, magnesia, titania and zirconia, for example. The inorganic oxides used as support materials may have an average particle size of from 5 microns to 600 microns, or from 10 microns to 100 microns, a surface area of from 50 $m^2$/g to 1,000 $m^2$/g, or from 100 $m^2$/g to 400 $m^2$/g, a pore volume of from 0.5 cc/g to 3.5 cc/g, or from 0.5 cc/g to 2 cc/g.

Desirable methods for supporting metallocene ionic catalysts are known in the art and described in, for example, U.S. Pat. No. 5,643,847, which is incorporated by reference herein. The methods generally include reacting neutral anion precursors that are sufficiently strong Lewis acids with the hydroxyl reactive functionalities present on the silica surface such that the Lewis acid becomes covalently bound. Activators may also be incorporated onto the support, using processes such as those disclosed in, for example, U.S. Pat. Nos. 6,777,366 and 6,777,367, both to Gauthier, et al., and incorporated herein by reference.

To prepare a polymer it is necessary, in general, to contact the monomer or mixture of monomers and the given metallocene catalyst and the described cocatalyst(s). In certain cases it is desirable that the catalyst has been preactivated. Those skilled in the art will understand that this refers to subjecting the metallocene catalyst to conditions that promote the desired interaction between the activator or cocatalyst and the metallocene. The most commonly employed method of activating a catalyst is simply heating it to a sufficient temperature and for a sufficient time, determined as a matter of routine experimentation. This is discussed further in, for example, U.S. Pat. No. 6,180,732, the disclosure of which is incorporated herein by reference. Other methods can be used. Those skilled in the art will appreciate that modifications in the above generalized preparation method may be made without altering the outcome. Therefore, it will be understood that additional description of methods and means of preparing the catalyst are outside of the scope of the invention, and that it is only the identification of the prepared catalysts, as defined herein, that is necessarily described herein.

The metallocene catalysts described herein are used to make homopolymers, copolymers and terpolymers using monomers including ethylene and/or propylene. A variety of processes may be employed to prepare the polymers. Among the varying approaches that may be used include procedures set forth in, for example, U.S. Pat. No. 5,525,678, which is incorporated herein by reference. The equipment, process conditions, reactants, additives and other materials will, of course, vary in a given process, depending on the desired composition and properties of the polymer being formed. For example, the processes discussed in any of the following patents may be useful, each of which is incorporated herein by reference: U.S. Pat. Nos. 6,420,580 6,380,328 6,359,072 6,346,586 6,340,730 6,339,134 6,300,436 6,274,684 6,271,323 6,248,845 6,245,868 6,245,705 6,242,545 6,211,105 6,207,606 6,180,735 and 6,147,173.

The catalyst systems described herein, including the identified family of cocatalysts, may be used over a wide range of temperatures and pressures. The temperatures may be in the range of from about 20° C. to about 280° C., or from about 50° C. to about 200° C. and the pressures employed may be in the range of from 1 atmosphere to about 500 atmospheres or higher. In general the temperatures, as well as other polymerization conditions including, for example, pressures, are frequently those at which previously employed cocatalysts, such as TIBAl and/or TEAl, tend to form species which are soluble in the polymerization diluent. It is this ability to offer production improvements under the same or similar production conditions that is an important advantage of using the invention. Such polymerization processes include solution, bulk, gas phase, slurry phase, high pressure processes, and combinations thereof.

Examples of solution processes are described in U.S. Pat. Nos. 4,271,060 5,001,205 5,236,998 and 5,589,555 and are incorporated herein by reference.

One example of a gas phase polymerization process generally employs a continuous cycle, wherein a cycling gas stream (otherwise known as a recycle stream or fluidizing medium) is heated in a reactor by heat of polymerization. The heat is removed from the recycle stream in another part of the cycle by a cooling system external to the reactor. The gaseous stream containing one or more monomers may be continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. See, for example, U.S. Pat. Nos. 4,543,399 4,588,790 5,028,670 5,317,036 5,352,749 5,405,922 5,436,304 5,456,471 5,462,999 5,616,661 and 5,668,228

The reactor pressure in a gas phase process may vary from about 100 psig to about 500 psig, or from about 200 to about 400 psig, or from about 250 to about 350 psig. The reactor temperature in a gas phase process may vary from 30° C. to 120° C. or 60° C. to 115° C. or 70° C. to 110C. or 70° C. to 95° C.

Other gas phase processes contemplated by the process includes those described in U.S. Pat. Nos. 5,627,242 5,665,818 and 5,677,375 and European publications EP-A-0 794 200 EP-A-0 802 202 and EP-B-634 421 all of which are incorporated herein by reference.

Slurry processes generally include forming a suspension of solid, particulate polymer in a liquid polymerization medium, to which monomers and optionally hydrogen, along with catalyst, are added. The suspension, including the polymerization diluent, may be intermittently or continuously removed from the reactor where the volatile components may be separated from the polymer and recycled, optionally after a distillation, to the reactor. The liquefied diluent employed in the polymerization medium is typically an alkane having from 3 to 7 carbon atoms, preferably a branched alkane. The medium employed should be liquid under the conditions of polymerization and relatively inert, such as hexane or, in one particularly desirable embodiment, isobutane.

The catalyst as a slurry or as a dry free flowing powder may be injected regularly to the reactor loop, which can itself be filled with circulating slurry of growing polymer particles in a monomer. Hydrogen, optionally, may be added as a molecular weight control. The reactor may be maintained at a pressure of from about 27 bar (2.7 mPa) to about 45 bar (4.5 mPa) (and a temperature of from about 38° C. to about 121° C. Reaction heat can be removed through the loop wall since much of the reactor is in the form of a double-jacketed pipe. The slurry may exit the reactor at regular intervals or continuously to a heated low pressure flash vessel, rotary dryer and a nitrogen purge column in sequence for removal of unreacted monomer and comonomers. The resulted hydrocarbon free powder can then be compounded for use in various applications. Alternatively, other types of slurry polymerization processes can be used, such stirred reactors is series, parallel or combinations thereof.

A slurry and/or polymerization process generally includes pressures in the range of 1 to 50 atmospheres (0.10 to 5.06 mPa) and even greater and temperatures of from about 0C to about 120° C.

A solution process can also be used. Examples of solution processes are described in U.S. Pat. Nos. 4,271,060 5,001,205 5,236,998 and 5,589,555; which are incorporated herein by reference.

Selection of monomers to prepare the polyolefins, including homopolymers, copolymer, terpolymers and the like, will be within the skill of those in the art. Such polymers may include those prepared using ethylene, propylene, propylene-ethylene, propylene-ethylene-butylene, propylene-ethylene-octene, propylene-ethylene-hexene and the like. Other terpolymers include those referred to as ethylene propylene diene monomer (EPDM) resins prepared using propylene, ethylene and one or more of group consisting of dicyclopentadiene (DCPD), ethylidene norbornene (ENB) or 1,4 hexadiene; 5-vinylnorbornene and mixtures thereof. The EPDM resins can be prepared using a diene having a terminal and an internal unsaturation.

Generally, the polymers produced as disclosed herein and blends thereof may be useful in such forming operations as film, sheet, pipe and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, geomembranes and pond liners. Molded articles include single and multi-layered constructions in the form of bottles, tanks, large hollow articles, rigid food containers, toys, and the like.

One aspect of the invention is the discovery that there may be an interaction between the decomposition products of TEAl and TIBAl and the solvent. In one embodiment, the invention may be practiced using TEAl and TIBAl as co-catalysts by selecting as the reaction solvent a solvent from which butene and isobutylene may be easily and effectively separated.

The following examples are provided to more fully illustrate the invention. As such, they are intended to be merely illustrative and should not be construed as being limitative of the scope of the invention in any way. Those skilled in the art will appreciate that modifications may be made to the invention as described without altering its scope. For example, selection of particular monomers or combinations of monomers; and modifications such as of catalyst concentration, feed rate, processing temperatures, pressures and other conditions, and the like, not explicitly mentioned herein but falling within the general description hereof, will still fall within the intended scope of both the specification and claims appended hereto.

EXAMPLES 1,2-ethylenebis(tetrahydroindenyl)zirconium dichloride (THI) supported on MAO/silica using standard methods known to those in the art is employed for all testing. Polymerizations are carried out under standard conditions known to those in the art. The reactor is first charged with isobutane and then catalyst, hydrogen and then the monomers. The target productivity is ca. 7,000 g PE/g catalyst. The length of time taken to reach target is recorded. Activity is defined as the productivity divided by the time (or, stated another way, the average ethylene consumption rate for the run).

TABLE 1

| Diluent | Isobutane |
|---|---|
| Supported Metallocene Catalyst | THI |
| Catalyst Charge (mg) | 75 |
| Productivity Target (g PE/g THI) | ca. 7,000 |
| Ethylene Concentration (wt. %) | 8.0 |
| Hydrogen (mL) | 500 |

TABLE 1-continued

| Comonomer | Hexene |
|---|---|
| Comonomer Concentration (Wt. %) | 2.4 |

Example 1

To compare performance of TIBAl, TNOAl and tri-n-hexyl aluminum ("TNHAl"), polymerizations at varying aluminum concentrations are performed under the standard conditions shown in Table 1. Activity data are provided in Table 2. Here, it can be seen that activity is not greatly compromised with the invention. Thus TNOAl and TNHAl, which will not readily produce or decompose to provide alkene products such as isobutylene or butene, can be effectively employed as cocatalysts for metallocene resins. This gives them great value in eliminating "post-metallocene hangovers" stemming from alkene contaminated when compared to TIBAl or TEAl.

During the polymerization studies it is noted that, with TIBAl cocatalyst, a slight buildup occurs on the blades of the agitator and a fine film is deposited on the walls and baffles of the reactor. From visual observations, the polymerization with THl and TNOAl showed less fouling as gauged by the degree of skinning of the walls on the bench reactor walls, baffles, and agitator. This observation is more pronounced at higher TNOAl levels, at which no significant skinning is observed. With TNOAl, the polymer does not agglomerate on the leading edge of the stirrer blades, as normally occurs with TIBAl polymerizations.

TABLE 2

| Cocatalyst | [Cocatalyst] (mmol/L) | Activity (g/g/h) |
|---|---|---|
| TIBAl | 0.15 | 11,030 |
| | 0.29 | 9,930 |
| | 0.43 | 9,750 |
| | 0.89 | 11,040 |
| TNOAl | 0.13 | 11,756 |
| | 0.25 | 10,547 |
| | 0.38 | 8,707 |
| | 0.89 | 3,011 |
| TNHAl | 0.12 | 5,904 |
| | 0.24 | 7,331 |
| | 0.36 | 7,569 |
| | 0.48 | 6,730 |
| | 0.89 | 5,229 |

Example 2

This example builds on the qualitative observations of Example 1 and describes experiments that compare quantitatively the degree of reactor fouling experienced using TIBAl and TNOAl. The general polymerization conditions are as described in Table 1. Here a cocatalyst level of 320 ppm relative to the isobutane diluent was employed. To probe the effects of trace water on the fouling potential, a partially-hydrolyzed cocatalyst was generated by addition of water the cocatalyst at a ratio of one mole of $H_2O$ per two moles of cocatalyst. Activity and agitator fouling results from these studies are shown in Table 3.

TABLE 3

| Cocatalyst | Activity (g PE/g THI/h) | Agitator Fouling (mg) |
|---|---|---|
| TIBAl alone | 10,600 | 30 |
| TIBAl/$H_2O$ | 10,600 | 180 |
| TNOAl alone | 10,400 | 10 |
| TNOAl/$H_2O$ | 6,400 | 10 |

While TIBAl alone does not lead to high agitator build up, it can be seen that the introduction of moisture into the system results in a six-fold increase in the amount of fouling as gauged by agitator build-up. It is noted that while activity levels without water are comparable between the two cocatalysts, there is a substantial decrease in the level of fouling encountered employing TNOAl or partially hydrolyzed TNOAl in the runs.

What is claimed is:

1. A process for preparing a polyolefin comprising:
   including as components in a polymerization mixture a metallocene catalyst supported on MAO/silica, wherein the catalyst selected from the group consisting of a CpFlu catalyst, a bis-indenyl catalyst, bridged mono-ligand metallocene compounds, and a combination thereof, and a polymerization diluent;
   selecting a cocatalyst selected from the group consisting of tri-n-octylaluminum (TNOAl), partially hydrolyzed tri-n-octylaluminum (TNOAl), tri-n-hexylaluminum (TNHAl), and combinations thereof;
   precontacting the metallocene catalyst and cocatalyst; and
   contacting at least one monomer under polymerization conditions with the polymerization mixture to produce a polyolefin.

2. The process of claim 1 wherein the polymerization is carried out in the substantial absence of other cocatalysts, activators and scavengers that react with water under polymerization conditions to form species that are highly soluble in the polymerization diluent.

3. The process of claim 1 wherein from 5 ppm to 1000 ppm of the selected cocatalyst in a solvent is used during production of the metallocene catalyzed polyolefin.

4. The process of claim 1 wherein the diluent is isobutane.

5. The process of claim 1 wherein the polyolefin is prepared in a loop reactor or a stirred reactor.

6. The process of claim 1 wherein the polymerization mixture further includes an activator, scavenger, or both, and wherein the activator is not a selected cocatalyst.

7. The process of claim 1 wherein polymerization conditions include a temperature at from 20° C. to 280° C.

8. The process of claim wherein the polymerization mixture futher includes an activator, scavenger, or both, and wherein the activator, scavenger, or both, is a cocatalyst selected from the group consisting of tri-n-octylaluminum (TNOAl), partially hydrolyzed tri-n-octylaluminum (TNOAl), tri-n-hexylaluminum (TNHAl), and combinations thereof.

9. A process for preparing a polyolefin comprising:
   providing a reactor;
   including as components in a polymerization mixture, a metallocene catalyst, supported on MAO/silica a polymerization diluent, and an olefin monomer;
   a cocatalyst selected from the group consisting of tri-n-octylaluminum (TNOAl), partially hydrolyzed tri-n-octylaluminum (TNOAl), tri-n-hexylaluminum (TNHAl), and combinations thereof; and wherein the cocatalyst does not cause production of undesired olefin byproducts that decreases activity of a catalyst as compared to using triisobutyl aluminum (TIBAl) or tri-ethylaluminum (TEAL) as a cocatalyst.

10. The process of claim 9 futher comprising an activator and wherein a ratio of the acativator to the catalyst is from 100:1 to 0.1:1.

11. The process of claim 9 wherein the diluent is comprised of an alkane having from 3 to 7 carbon atoms that is branched or unbranched.

12. The process of claim 9, further comprised of the steps of:
preparing a metallocene catalyzed polyolefin in the production equipment;
removing the metallocene polymerized polyolefin from the equipment; and
subsequently polymerizing an olefin with a chromium catalyst in the reactor previously used for the metallocene catalyzed polymerization.

13. The process of claim 9, further comprised of the steps of:
preparing a metallocene catalyzed polyolefin;
recovering the diluent for recycling; and
subsequently polymerizing an olefin with a chromium catalyst using the recovered diluent previously used for the metallocene catalyzed polymerization.

14. The process of claim 9 wherein the metallocene catalyst activity is at least 5229 g/g/hr by using the selected cocatalyst.

* * * * *